(12) United States Patent
Snell

(10) Patent No.: US 8,972,424 B2
(45) Date of Patent: Mar. 3, 2015

(54) SUBJECTIVE LINGUISTIC ANALYSIS

(71) Applicant: Peter Snell, Gardiner, ME (US)

(72) Inventor: Peter Snell, Gardiner, ME (US)

( * ) Notice: Subject to any disclaimer, the term of this patent is extended or adjusted under 35 U.S.C. 154(b) by 230 days.

(21) Appl. No.: 13/672,988

(22) Filed: Nov. 9, 2012

(65) Prior Publication Data

US 2013/0108996 A1   May 2, 2013

Related U.S. Application Data

(63) Continuation-in-part of application No. 12/790,124, filed on May 28, 2010, now Pat. No. 8,312,029.

(60) Provisional application No. 61/182,536, filed on May 29, 2009.

(51) Int. Cl.
| | | |
|---|---|---|
| *G06F 7/00* | (2006.01) | |
| *G09B 19/00* | (2006.01) | |
| *G06F 17/27* | (2006.01) | |
| *G06F 17/30* | (2006.01) | |

(52) U.S. Cl.
CPC ............. *G09B 19/00* (2013.01); *G06F 17/277* (2013.01); *G06F 17/2785* (2013.01); *G06F 17/3061* (2013.01)
USPC .................. 707/755; 707/769; 704/4; 704/7; 704/251; 715/255

(58) Field of Classification Search
CPC ...................................................... G06F 17/27
USPC ............ 707/755, 769; 715/255; 704/4, 7, 251
See application file for complete search history.

(56) References Cited

U.S. PATENT DOCUMENTS

| | | | |
|---|---|---|---|
| 5,625,814 | A | 4/1997 | Luciw |
| 5,694,523 | A | 12/1997 | Wical |
| 5,768,580 | A | 6/1998 | Wical |
| 6,418,435 | B1 | 7/2002 | Chase |
| 6,487,545 | B1 | 11/2002 | Wical |
| 6,523,001 | B1 | 2/2003 | Chase |
| 6,587,846 | B1 | 7/2003 | LaMuth |

(Continued)

OTHER PUBLICATIONS

Su et al., From Words to Senses: A Case Study of Subjectivity Recognition, in Proceedings of the 22nd International Conference on Computational Linguistics (COLING-2008), Manchester, UK, Aug., pp. 825-832.*

(Continued)

*Primary Examiner* — Cheyne D Ly
(74) *Attorney, Agent, or Firm* — Caseiro Burke LLC; Chris A. Caseiro

(57) ABSTRACT

A system and related method for the electronic processing of text onto a two-dimensional coordinate system to analyze the attitudinal mindset associated with the text. The system and related method may also be employed to generate text based on a desired attitudinal mindset to impart. The system includes a computer system embodying functions that enable a user to analyze the text. The system includes one or more functions to parse attitudinal words and objective words and associate two-dimensional coordinates with the subjective words. The system further includes one or more functions for mapping the associated two-dimensional coordinates to show the geographic locations of each attitudinal word of the text in relation to each other attitudinal word of the text. The system decomposes attitudinal words into attitudinal equivalence and reference category and enables the generation of a report of the mindset associated with the analyzed text.

8 Claims, 22 Drawing Sheets

| | | Expectations | | |
|---|---|---|---|---|
| | Same | | Different | |
| Tranquil | Submissive | Stagnating | Helpless | Over-Whelming |
| Relaxed | Accepting | Unsure | Frustrated | Anxious |
| Comfort-Able | OK | Neutral | Different | Difficult |
| Happy | Satisfied | Positive | Challenge | Ambitious |
| Joy | Excited | Confident | Determined | Assertive |

(Lack of Perceived Control ... Perception of Control)

Cartesian System Generic Attitudes

(56) References Cited

U.S. PATENT DOCUMENTS

| | | | |
|---|---|---|---|
| 6,763,341 | B2 | 7/2004 | Okude |
| 6,778,970 | B2 | 8/2004 | Au |
| 7,152,031 | B1 | 12/2006 | Jensen et al. |
| 7,197,451 | B1 | 3/2007 | Carter et al. |
| 7,236,963 | B1 | 6/2007 | LaMuth |
| 7,260,519 | B2 | 8/2007 | Polanyi et al. |
| 7,305,336 | B2 | 12/2007 | Polanyi et al. |
| 7,389,225 | B1 | 6/2008 | Jensen et al. |
| 7,401,087 | B2 | 7/2008 | Copperman et al. |
| 2003/0182310 | A1 | 9/2003 | Charnock et al. |
| 2004/0148274 | A1 | 7/2004 | Warnock et al. |
| 2005/0005266 | A1 | 1/2005 | Datig |
| 2005/0091038 | A1* | 4/2005 | Yi et al. .................. 704/10 |
| 2005/0149510 | A1 | 7/2005 | Shafrir |
| 2006/0110715 | A1 | 5/2006 | Hardy |
| 2007/0033189 | A1 | 2/2007 | Levy et al. |
| 2007/0150398 | A1* | 6/2007 | Rossen et al. ............ 705/36 R |
| 2007/0214126 | A1 | 9/2007 | Kikinis |
| 2007/0219933 | A1 | 9/2007 | Datig |
| 2007/0226166 | A1 | 9/2007 | Labreuche et al. |
| 2008/0104063 | A1 | 5/2008 | Gallivan et al. |
| 2008/0133213 | A1 | 6/2008 | Pollara |
| 2009/0048823 | A1* | 2/2009 | Liu et al. ..................... 704/9 |
| 2010/0235308 | A1* | 9/2010 | Takamatsu ................ 706/12 |

OTHER PUBLICATIONS

Hatzivassiloglou et al., Predicting the Semantic Orientation of Adjectives, ACL '98 Proceedings of the 35th Annual Meeting of the Association for Computational Linguistics and Eighth Conference of the European Chapter of the Association for Computational Linguistics, pp. 174-181.*

Lee et al., Opinion Mining of Customer Feedback Data on the Web, Proceeding ICUIMC '08 Proceedings of the 2nd international conference on Ubiquitous information management and communication pp. 230-235.*

PCT International Search Report and Written Opinion for related PCT application serial No. PCT/US10/01574, Sep. 10, 2010, 10 pp.

Moore, M, Scientists Devise Algorithm to Detect Sarcasm, published in the Telegraph online, available at http://www.telegraph.co.uk/technology/news/7740955/Scientists-devise-algorithm . . . [more], May 19, 2010, 2 pp.

Mihalcea, R. et al., Learning Multilingual Subjective Language via Cross-Lingual Projections, Proceedings of the Association for Computational Linguistics (ACL), available at http://www.cse.unt.edu/~rada/papers/mihalcea.acl07.pdf, 2007, 8 pp.

Pang, B. and Lee, L., A Sentimental Education: Sentiment Analysis Using Subjectivity Summarization Based on Minimum Cuts, Proceedings of the Association for Computational Linguistics (ACL), available at http://www.cs.cornell.edu/home/llee/papers/consent.home.html, 2004, 8 pp.

Pang, B. and Lee, L., see 4.1.2 Subjectivity Detection and Opinion Identification in Opinion Mining and Sentiment Analysis, Now Publishers, Inc., 2008.

Osgood, C. et al., The Measurement of Meaning, University of Illinois Press, 1957. The book is contained in the file for U.S. Appl. No. 12/790,124. The artifact sheet is submitted herewith.

Snell, P., The Frustration Matrix Guide: What Frustration Can Tell You and What You Can Do About It, created over 2003-2004, 171 pp.

Damerau, F., Automatic Parsing for Content Analysis, Communications of the ACM, vol. 13, No. 6, Jun. 1970, pp. 356-393.

Cottam, J., Declarative Visualization, Open Systems Laboratory, Indiana University, Apr. 30, 2008, pp. 1-43.

Kwon et al., Multidimensional Text Analysis for eRulemaking, The 7th Annual Conference on Digital Government Research '06, May 21-24, 2006, San Diego, CA, U.S., pp. 1-10.

* cited by examiner

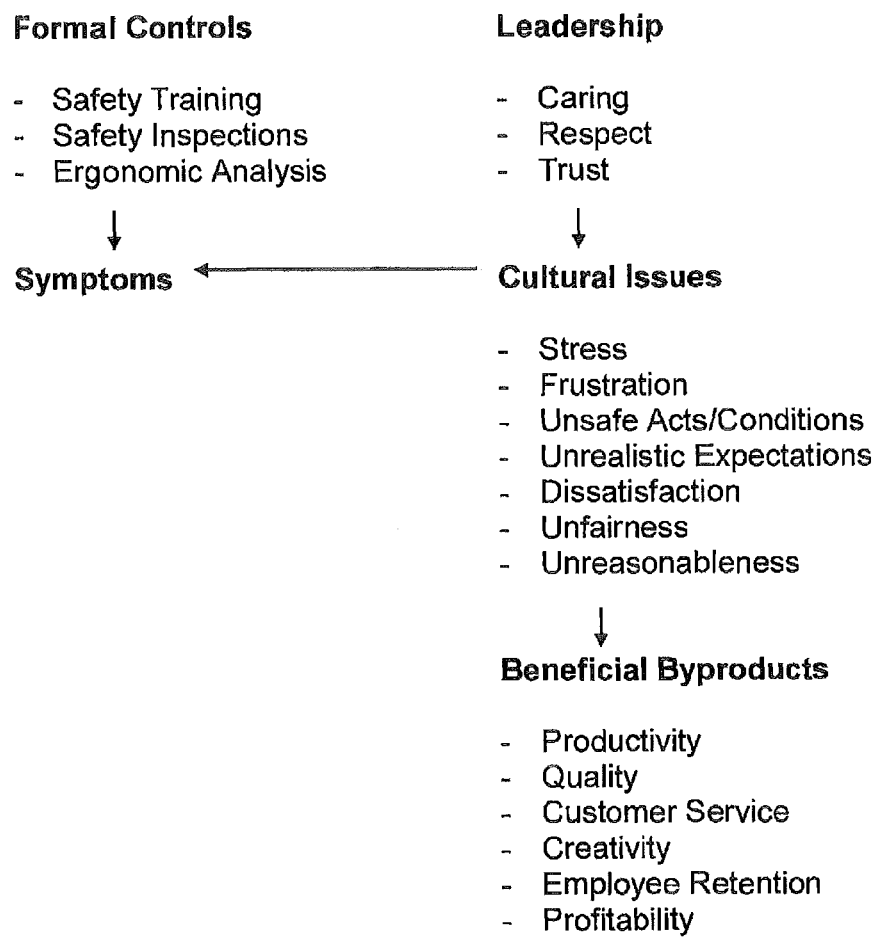
Figure 1. The Institutional and Cultural Schematic

|                    | Expecting Same | Expecting Different |
|--------------------|----------------|---------------------|
| Lack of Control    | Acceptance     | Frustration         |
| Perceived Control  | Satisfaction   | Challenge           |

Figure 2. The Primary Attitude Matrix

|  | Text Analysis | Sentiment Opinion/Analysis | Psycho-Social |
|---|---|---|---|
| Generation | $1^{st}$ | $2^{nd}$ | $3^{rd}$ |
| Inception | 1995 | 2005 | 2010 |
| Addresses | Objective | Hybrid Objective/ Subjective | Subjective |
| Domain | Content, information, data, knowledge | Mktg. Intelligence, Political Opinions | Subconscious Mindset |
| # of Dimensions | N/A | 1-Dimensional | 2-Dimensional |
| Approach | Statistical | Natural language Processing (NLP), Computational Linguistics | Psychosocial Matrix |
| Benefit | Content search engine, data mining, knowledge classification | Focused solutions, voice of cust., favorability continua | Characterize & quantify subconscious mindset |

Figure 3. The Three Types of Linguistic Analysis

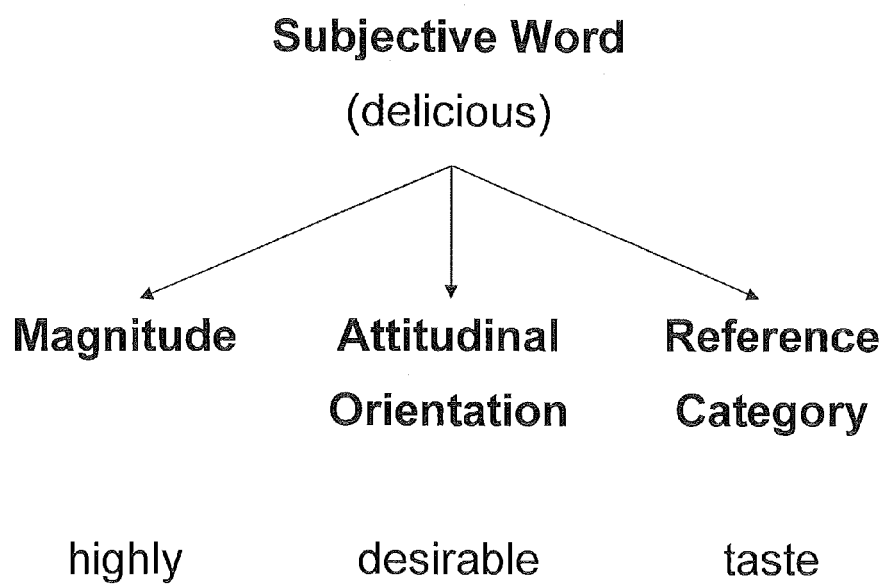
Figure 4. The Decomposition Process

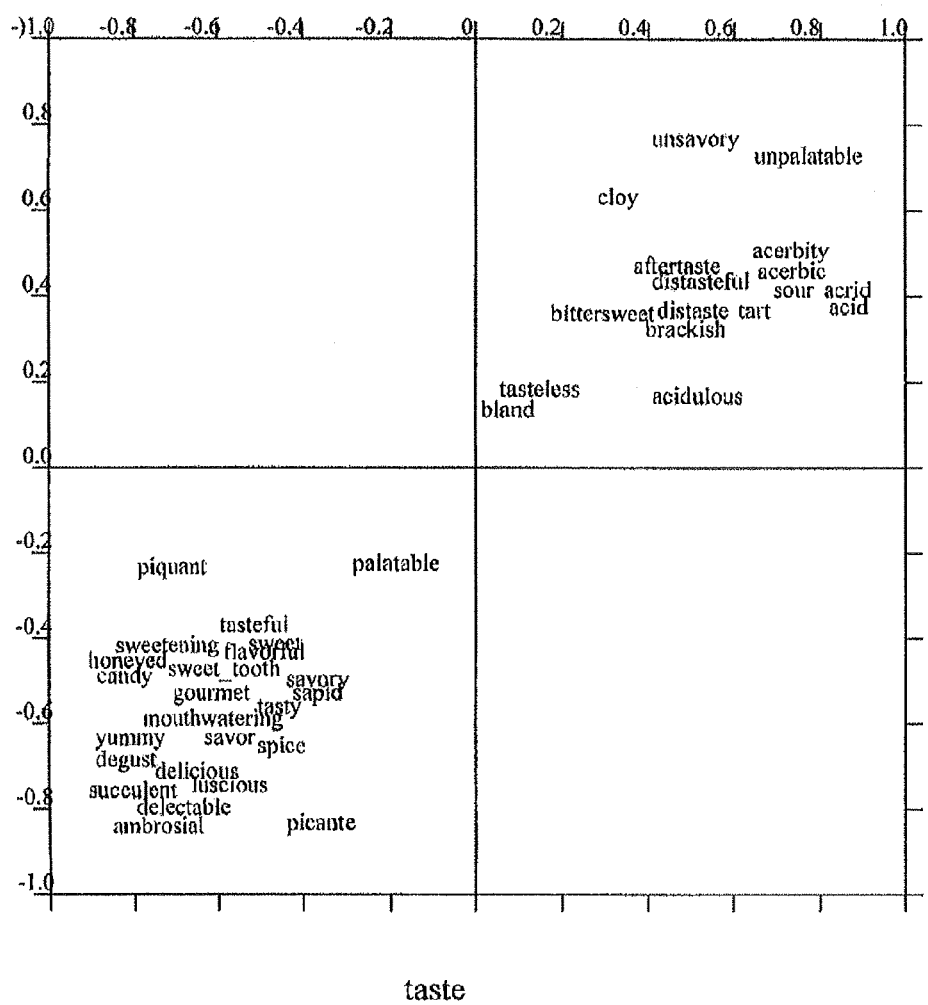
Figure 5. The Linguistic Category of Taste

|  | Objective | Subjective |
|---|---|---|
| Composition | Information, data, knowledge, content | Human expression |
| Examples | green, toy, man, piece, walk, DNA, see, seven | pleased, sour, humility, arrogance, serenity, difficult, neutral |
| Sample sentence | The woman walked across the street. | The seductive flirt walked alluringly across the street.* |
| Analogy | black & white tv | color tv |
| Presence | 70% | 30% |
| % usage | 75% | 25% |

Figure 6. The Two Types of Words

\* Note: attitudinal/human expression words are underlined.

Figure 7. Mapping Attitudinal Intensity

Expectations

|  | Same |  |  | Different |  |
|---|---|---|---|---|---|
| Lack of Perceived Control | Tranquil | Submissive | Stagnating | Helpless | Over-Whelming |
|  | Relaxed | Accepting | Unsure | Frustrated | Anxious |
|  | Comfort-Able | OK | Neutral | Different | Difficult |
| Perception of Control | Happy | Satisfied | Positive | Challenge | Ambitious |
|  | Joy | Excited | Confident | Determined | Assertive |

Figure 8. Cartesian System Generic Attitudes

Satisfaction ←——————→ Positive ←——————→ Challenge

Figure 9. Mapping Lateral Attitudinal Distance

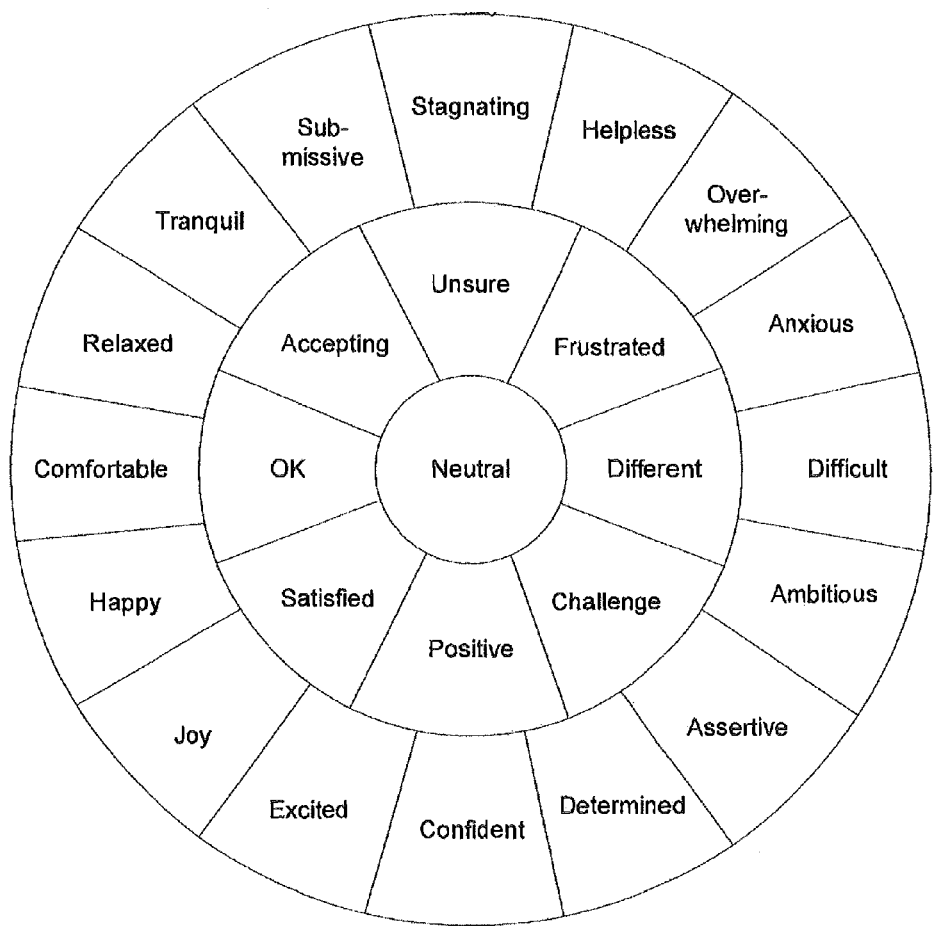
Figure 10. Polar Generic Attitudes

| Word | Generic Attitude | %Exp | % Control | X | Y |
|---|---|---|---|---|---|
| Dissatisfaction | Frustration | -.4 | -.4 | -.4 | -.4 |
| Good | Satisfaction | +.4 | +.4 | +.4 | +.4 |
| Determined | Determined | -.4 | +.8 | -.4 | +.8 |
| Neutral | Neutral | 0 | 0 | 0 | 0 |
| Uncertain | Unsure | 0 | -.4 | 0 | -.4 |

Figure 11. Sample Dictionary Entries

"Do you know what it feels to be spit on your face and to have trash shoved down your throat? Do you know what it feels like to dig your own grave? Do you know what it feels like to have your throat slashed from ear to ear? Do you know what it feels like to be torched alive? Do you know what it feels like to be humiliated and be impaled upon on a cross? And left to bleed to death for your amusement? You have never felt a single ounce of pain your whole life. Did you want to inject as much misery in our lives as you can just because you can? ... I didn't have to do this. I could have left. I could have fled. But no, I will no longer run. It's not for me. For my children, for my brothers and sisters that you fucked, I did it for them ... When the time came, I did it. I had to ... You had a hundred billion chances and ways to have avoided today, but you decided to spill my blood. You forced me into a corner and gave me only one option. The decision was yours. Now you have blood on your hands that will never wash off."

Note: attitudinal words are underlined

Figure 13. Virginia Tech Massacre Manifesto Excerpt

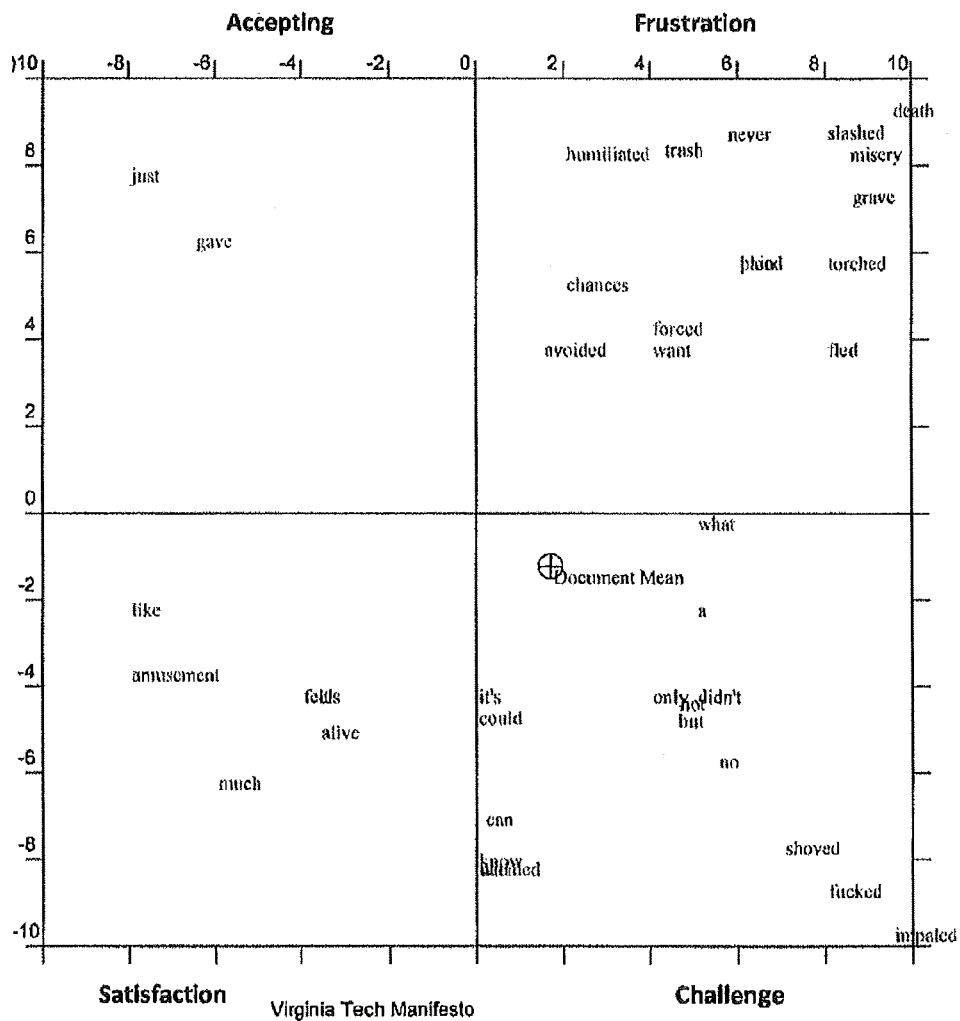
Figure 14. Mapped Words of the Virginia Tech. Massacre Manifesto

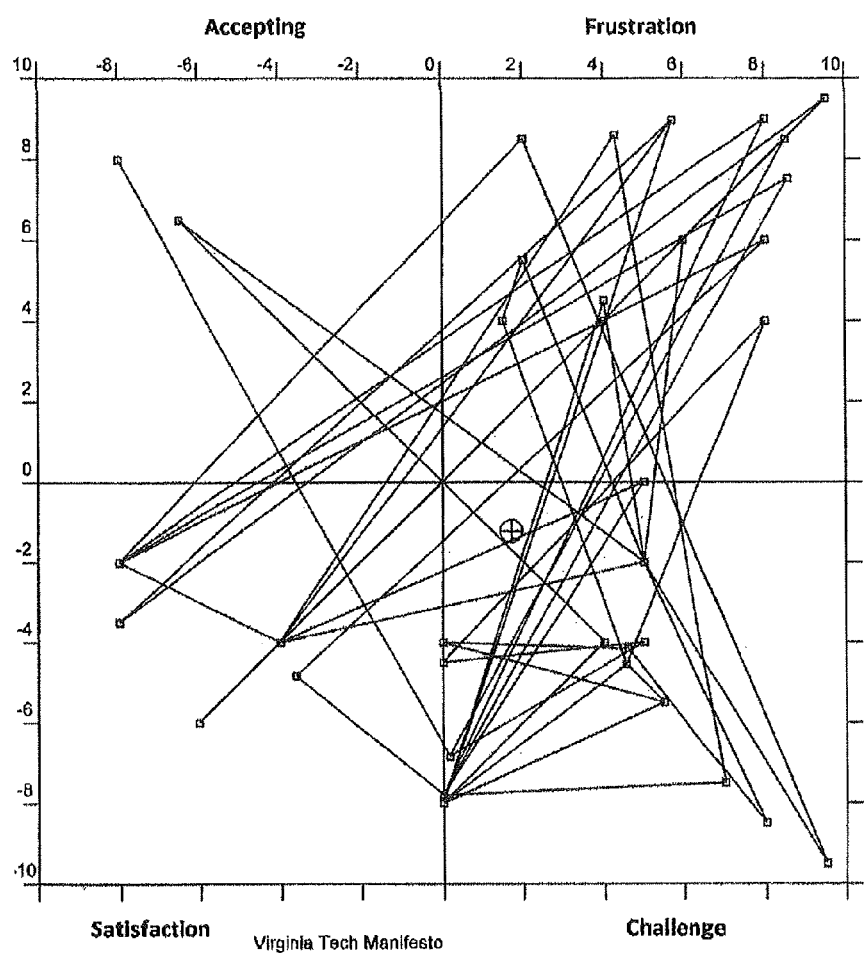
Figure 15. Connecting the Dots of the Virginia Tech. Massacre Manifesto

|  | Definition |  |  |  | Meaning |
|---|---|---|---|---|---|
| Highly + | Desirable | + | Taste | = | Delicious |
| Highly + | Desirable | + | Appearance | = | Beautiful |
| Highly + | Desirable | + | Quality | = | Excellent |
| Equivalent Attitudes |  |  | Reference Category |  |  |

Figure 16. Equivalent Attitudes and Reference Categories

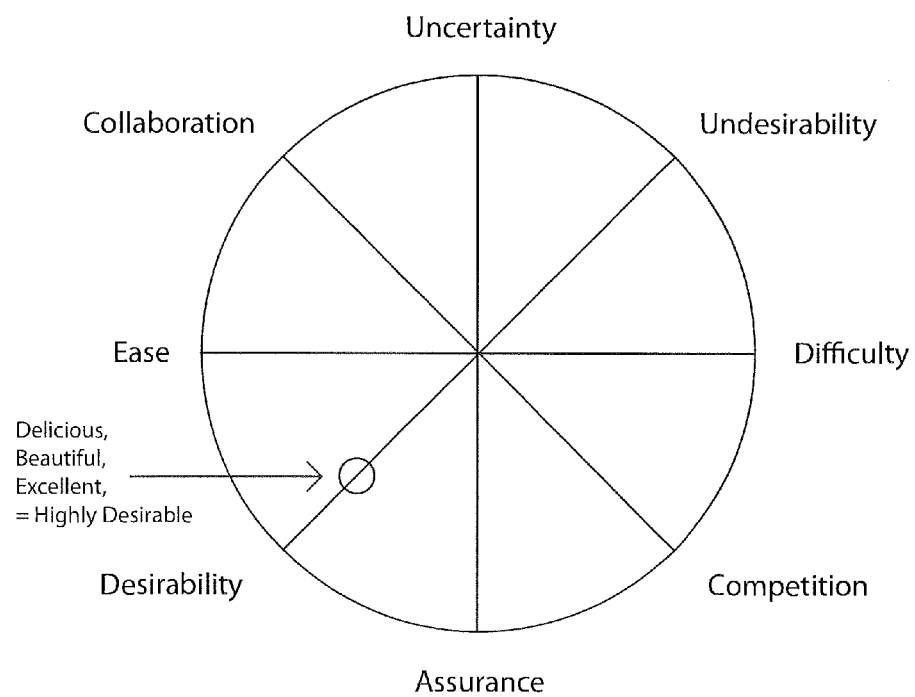
FIGURE 17. THE LINGUISTIC (POLAR) REPRESENTATION

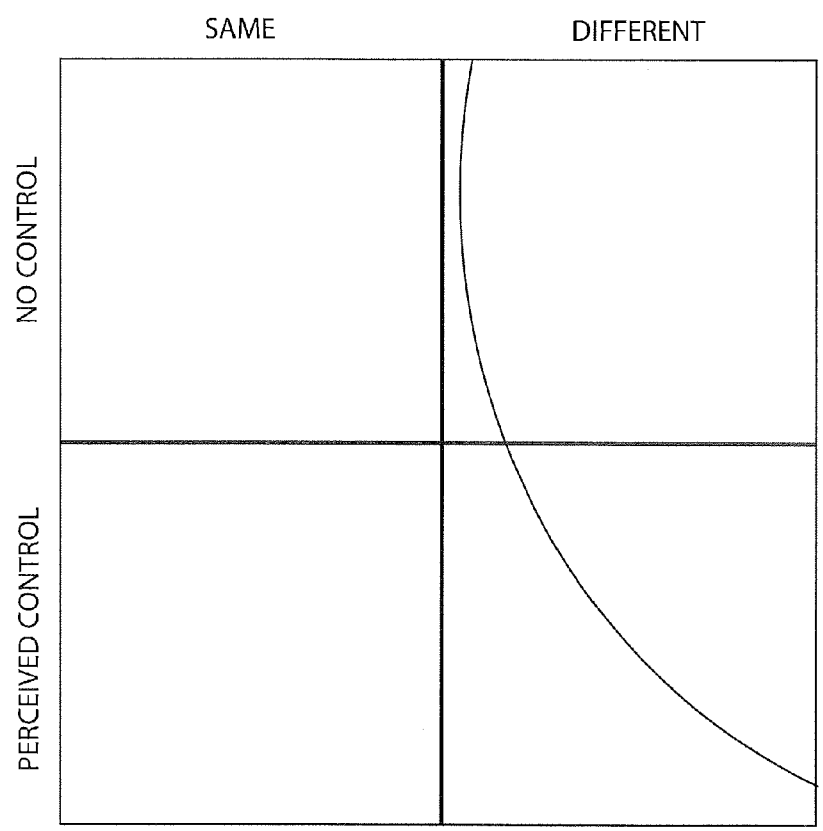
FIGURE 18. ENGAGEMENT

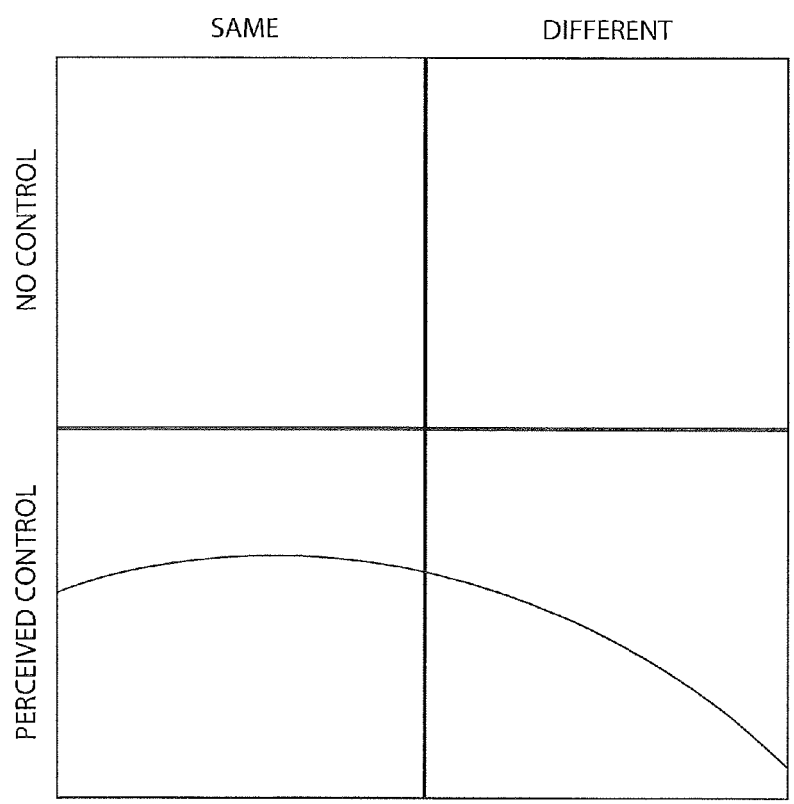
FIGURE 19. CONTROL

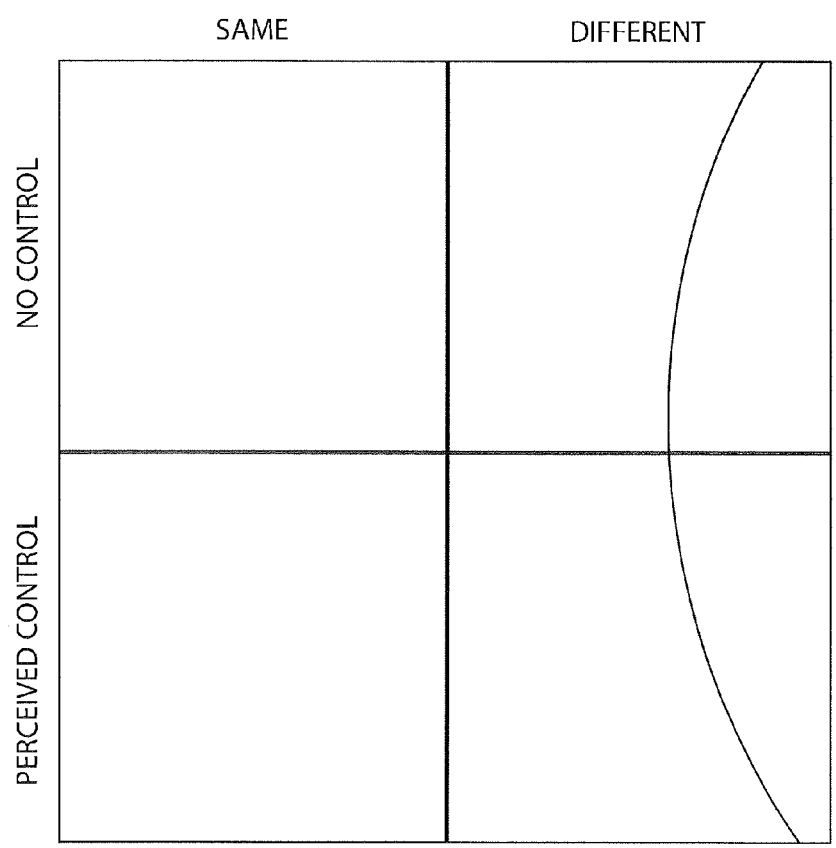
FIGURE 20. SOVEREIGNTY

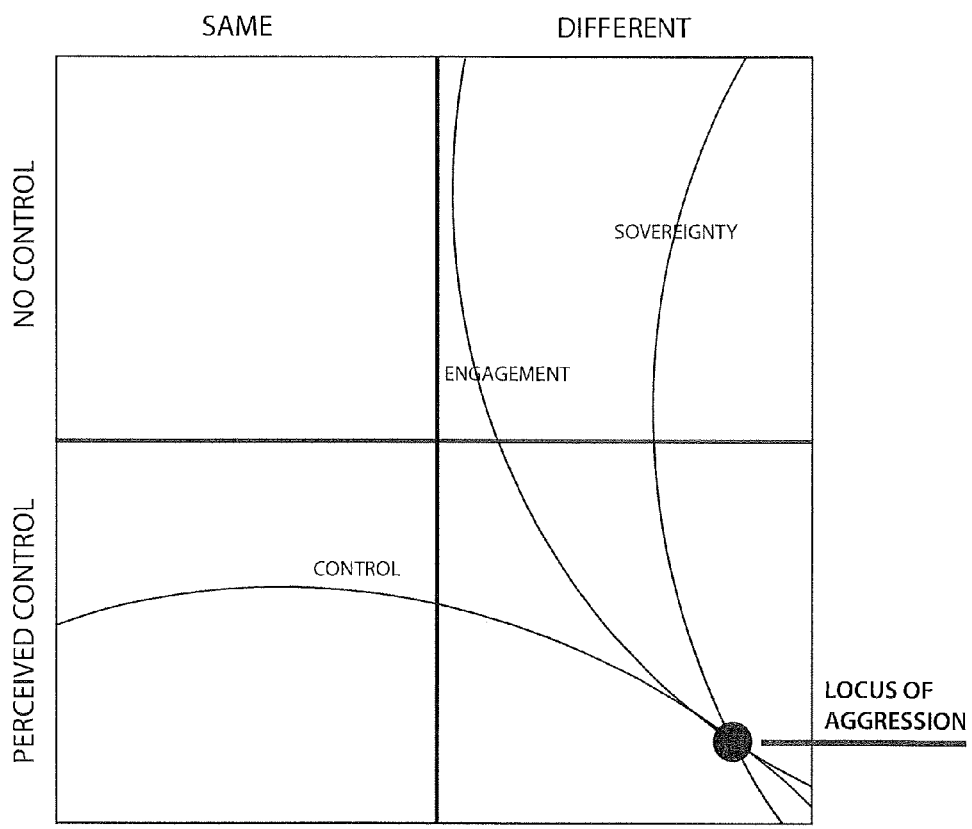
FIGURE 21. INTERSECTION OF THREE REFERENCE CATEGORY LINES OF POSITION

SUBJECTIVE LINGUISTIC ANALYSIS

CROSS REFERENCE TO RELATED APPLICATIONS

The present invention is a continuation-in part and claims the priority benefit of U.S. patent application Ser. No. 12/790,124, filed May 28, 2010, entitled "SYSTEM AND RELATED METHOD FOR DIGITAL ATTITUDE MAPPING" by the inventor of the present invention, which parent application is related to, and claims the priority benefit of, U.S. provisional application No. 61/182,536, filed May 29, 2009, entitled "DIGITAL ATTITUDE MAPPING ALGORITHM" by the inventor of the present invention. The entire contents of both applications are incorporated herein by reference.

BACKGROUND OF THE INVENTION

1. Field of the Invention

The present invention is a system and related algorithm that processes any electronic text onto a Cartesian coordinate system to analyze the underlying attitudinal mindset of that text through multivariate processing; displays the analysis demographically, geographically, and metrically; and articulates the results into a representative analytical report.

2. Description of the Prior Art

In the early 1990's the present inventor, a workers' compensation consultant working for employers to reduce the magnitude of workplace injuries, having written a 350-page self-published book in 1993 on workers' compensation program management, used it as the primary text for his 30-hour course. For the most part, the process emphasized traditional safety compliance and risk management controls (such as safety committees, transitional work, and addressing injuries of the greatest expense/pain and suffering). In 1995, in looking to expand the process further, in a 1,400-hr. study of "what makes safe companies safe", the inventor consciously recognized what he had always intuitively known, that a disgruntled employee is far more likely to get hurt. FIG. 1 is a revised version of the 1997 schematic of an unpublished article developed by the inventor to represent the relationship between worker attitudes and outcomes.

After seeking to blend the left (institutional) and right (cultural) sides of the schematic, the inventor recognized the incompatibility of such a combined result. In seeking to understand the process further, the inventor discovered a unique relationship between stress, frustration, unrealistic expectations, and lack of control over one's situation. The process was described in an unpublished article in 1999. FIG. 2 reflects an elementary 2×2 matrix. In essence, the matrix represents two opposite pairs of situational attitudes of satisfaction (stuff that makes you feel good) and frustration (stuff that makes you feel lousy), and, similarly, challenge and acceptance. The right side reflects expectation that the situation should be different and the left side reflects expectation that the situation should remain the same. Similarly, the top half reflects lack of perceived control and the bottom reflects perceived control over the situation.

Thereafter, the inventor, in seeking to apply the concept to the workplace, used the process as a tool to better understand emotional stress and frustration in improving workers' compensation programs and employee turnover, from a cultural aspect. In this approach, the inventor expanded the 4×4 matrix to a 6×6 matrix that employed relatable phrases (within each cell) that associated a person's situational attitudes and transferred those selections back to the 6×6 map to enhance dialogue. It was neither purposeful to expand the matrix in greater detail than 6×6 nor to automate the process.

The initial process complements the well-established Myers-Briggs Type Indicator® (MBTI). As such, MBTI recognizes personalities, which can be described as one's identity regardless of the situation. In other words, although the situation changes, one's personality doesn't change very much, which begs the question: what is one's identity when the situation does change? To the inventor's knowledge, this psychosocial process is the best layperson's answer to that question. As such, both processes are ultimately interested in psychosocial identity.

In 2002, the inventor copyrighted a 193-page book titled *The Frustration Matrix Guide*, detailing the process of the psychosocial piece of the analysis described above. Included was a series of anecdotal experiences to provide familiarity and relatability to the psychosocial process. The entire content of that book is incorporated herein by reference.

In 2003, the inventor recognized that, beyond psychosocial messaging, abstract linguistic words also conformed to the matrix, whether or not directly associated with psychosocial tendencies. The linguistic referencing evolved into attitudinal, psychosocial, human expression and, most recently, subjective terminology. In this document, the four terms are used interchangeably.

Although this inventor was not aware of prior technology in the course of writing the book identified above, Osgood, Suci, and Tannenbaum, in their 1957 book, *The Measurement of Meaning*, (1) measured distances within bipolar adjectives based on an analogue technique. In this approach, they distinguished intensities (although generally, only a sampling) of 78 bipolar adjectives along each continuum. (This inventor mapped 16,000 subjective words/phrases, adding nouns, verbs, adverbs, and the remainder of almost all adjectives.) The terms "subjective", "psychosocial", and "attitudinal" may be used throughout here as interchangeable equivalents. Although Osgood et al. described radial distance; they did not describe a process for constructing lateral measurement between the radians. Furthermore, the present invention, in not only exercising independent variable mapping, also employs a digital approach. As such, in absence of a subconscious mindset architecture/derivative, Osgood's reference to subconscious mindset origin is lacking.

Later, Hardy, in his "Verbal-Visual Framework Method" US published patent application Pub. No. US 2006/0110715 A1 of May 25, 2006, proposed a marketing application employing, for the most part, Osgood's analog mapping process.

Linguistic Analysis Continuum

In order to understand this technology, it is instructive to review the recent history of automated Linguistic Analysis, ranging from Text Analysis through Sentiment/Opinion Analysis, to the current Subjective Linguistic Analysis. FIG. 3 compares and contrasts these three technologies. In the mid 1990's, Text Analysis emerged as a form of Linguistic Analysis that reviewed texts for a wide variety of objective factors, such as content, data, information, and knowledge. Currently, there are scores of analytic techniques, including statistics, that perform many different types of analyses, the most familiar being data mining.

With the aid of Artificial Intelligence (A/I), Natural Language Processing (NLP) facilitated marked improvement in the automated analysis of language, primarily by clarifying ambiguity of meaning based on the context of usage within the text.

As a result, Sentiment Analysis (SA) and Opinion Analysis (OA) (which are often referred to synonymously) seek to determine an attitude relative to a particular subject or issue. This process emerged in 2005. SA incorporates NLP, computational analysis, and statistics and seeks to determine an attitude along a particular one-dimensional continuum, such as from favorability through unfavorability, for the particular issue under review. OA involves opinion-oriented informational analysis. Although the stated objective of both processes is to determine the attitude of a speaker/writer with respect to a particular topic, they employ highly directed solutions for specific applications.

As useful a departure from analysis of strictly objective linguistics as SA and OA are, they do not simultaneously accommodate multiple subjective continua (e. g., desirability (undesirable through desirable) and also affiliation (collaborative through competitive)). In other words, if tasked to analyze both desirability and affiliation in the same application, SA/OA are unable to do so because of their one-dimensional aspect. As a result, although SA (primarily) and OA (secondarily) address subjective linguistics, their one-dimensional referencing restricts their ability to simultaneously embrace every subjective word. Given this limitation, and recognizing the positive step beyond purely objective Text Analysis, if by definition, the present invention of Subjective Linguistic Analysis excludes every objective word, includes every subjective word, and embraces two-dimensional continua, SA and OA, which are unable to qualify for those criteria, fall into a mid-range, or hybrid subjective category.

A parallel approach to the proposed technology is to distinguish sentences, as a whole, as either objective or subjective. Given the lack of two-dimensional mapping, it is constrained to remain within polarity. Removing objective sentences in order to improve the polarity is a viable approach, that is, of course, if one is willing to discard all included subjective word messaging when discarding the entire objective sentence.

Again, the concept of restricting the author's frame of mind to entire sentences is consistent with the notion as presented in this proposed technology of segregating objective words from subjective words. However, the platform of an entire sentence often includes multiple subjective messages. Moreover, lacking a two-dimensional template constrains the analysis to polarity continua of single category referencing.

The proposed technology neither restricts the insight to entire sentences nor is it constrained to polarity continua. As such, while the composite sentence approach is important within Phase II Linguistic Analysis, it prohibits entry into Phase III.

The Decomposition Process.

When one hears the subjective word, delicious, subconsciously, three criteria register: the attitudinal orientation of desirability, the magnitude of highly desirable, and the reference category of taste. (The present invention decomposes attitudinal/subjective words into a reference category, magnitude, and orientation of attitude, which is reflected in FIG. 4 and described herein.) Or, if viewed in reverse, the most appropriate words that satisfy the criteria of taste, desirability, and to a high degree, are very similar: delicious, succulent, tasty, and delectable. The possibility of distasteful, while a member of the reference category of taste, is highly undesirable. Similarly, while beautiful is highly desirable, it belongs to a different reference category of appearance. Interestingly, beautiful and delicious are attitudinally equivalent in that they both elicit high desirability, even though they belong to different reference categories.

An unsettling realization of equivalent attitudes is that of mathematical mapping (digitization) whereby, because subjective meaning is ingrained within the combination of equivalent attitude and reference category, the outward message, and, therefore, aspect of meaning, has become transcended.

Decomposition of Subjective Words into Reference Category and Attitudinal Equivalents.

Many approaches to Linguistic Analysis have grouped subsets of subjective lemmas (basic words) and positioned them along a linear continuum, such as from desirability through undesirability, happiness through sadness, and strength through weakness. To varying degrees, these efforts have not exhausted identifying every reference category, and, especially, every subjective lemma within the reference category. Moreover, none have been referenced on a two-dimensional template such that every lemma is portrayed within a reference category and that every reference category is presented relative to every other reference category. Finally, no other representation has associated every subjective/attitudinal word in reference to the continua of a pair of independent variables.

In the case of Suci et al., 78 categories were listed and contained representative (although not exhaustive) membership of all words in a particular reference category. The present invention considers that many categories and more such that there may be 250 or more categories or some other number provided that all 16,000 subjective lemmas listed in common usage in the American language are included in a reference category and may be in more than one reference category.

The present invention considers the categorization of words and their associated lemmas. FIG. 5 described herein is a display of the reference category of taste where 41 lemmas within the reference category are shown in a scattered alignment loosely ranging from strong desirability (ambrosial) to strong undesirability (unpalatable). Moreover, they also conform to the independent variables of expectation of change (horizontally) and perception of control (vertically). For example, in the case of unpalatable, one would strongly expect that the situation should be different (if one were to continue eating) and the present situation would indicate that the person lacked perceived control to have provided desirable taste. It is to be understood that other categories exist for other groups of words and the "taste" reference category is one example. Appearance and quality are two other examples of word categories.

What is needed is a better mechanism for mapping attitudes from texts and, especially, a mechanism that processes and interprets all subjective words for the underlying frame of mind.

SUMMARY OF THE INVENTION

The system and process of the present invention evolved from the recognition that psychosocial attitudes could be mapped onto a Cartesian coordinate system; recognized that abstract attitudinal linguistic words and phrases could be individually mapped onto the same system; developed a system and method of mapping, such as through a computer program, manual analysis, or a combination of the two; processed subjective words from an electronic version of text to respective coordinate locations; analyzed the mapping pattern for demographic, geographic, and metric distributions; and interpreted the attitudinal mindset of the text. The text may originate as written text or be a recording of spoken words.

Given the independent variables of "expectations of change" and "perception of control", the dependent variables (attitudes) involve subconscious attitudinal referencing.

The effect of this process is to project mapped attitudinal words onto a template that provides a representative signature of the writer/speaker's underlying mindset as of the time the text was expressed.

The process of the present invention: 1) recognizes that a psychosocial configuration can incorporate linguistic messaging; 2) distinguishes between objective and subjective words; 3) recognizes linear distance referencing between subjective words (both in radial distance and radial arc); 4) develops a matrix layout of the most representative (generic) subjective words; 5) identifies 16,000 subjective words and phrases and associates their respective Cartesian coordinates (creates a "dictionary"); 6) implements an algorithm through a computer program that receives a text, recognizes subjective words, maps the subjective words according to the dictionary, and performs multivariate analysis for demographics, geographics and metrics; and 7) presents a referencing process that interprets mathematical references into underlying attitudinal mindsets.

Whereas usage of the broader term, "dictionary" references all (53,000) subjective words and phrases in common usage and the composite mapping of all subjective words, the term "lemma table" (16,000 words) restricts words to subjective lemmas. (A lemma is defined as the base word of a noun (in singular form) or verb (in present tense). For example, the lemma of found, finding, and finds, is find, for which the base definition is the same.) (Note: it is recognized that some lemmas have multiple meanings. As is discussed elsewhere in this submission, it is recognized that NLP competently differentiates words by meaning. Because this submission recognizes attitudinal equivalency and is not competing with the process of distinguishing words by meaning, given the various contexts of lemmas in common usage, the number of different meanings for individual lemmas will necessarily increase well beyond 16,000. The fact remains that, for every subjective lemma meaning, this process accommodates every variation.)

The invention is described in the accompanying drawings, the detailed description, and the appended claims.

BRIEF DESCRIPTION OF THE DRAWINGS

FIG. 1, "The Institutional and Cultural Schematic" illustrates the functional relationships between attitudes and outcomes.

FIG. 2, "The Primary Attitude Matrix" provides a matrix for mapping the psychosocial mindset and illustrates the functional relationships between independent variables of expectation of change and perception of control and the dependent variable of attitudes.

FIG. 3, "The Three Types of Linguistic Analysis", differentiates linguistic analysis techniques on the continuum from objective to subjective.

FIG. 4, "The Decomposition Process", illustrates the subdivisions of a subjective word of reference category, orientation, and magnitude.

FIG. 5, "The Linguistic Reference Category of Taste", shows the distribution of attitudinal words in the taste reference category.

FIG. 6, "The Two Types of Words" distinguishes between objective words (data, information, content, and function) and subjective words (human expression). The locus of this invention excludes objective words, phrases, etc. and includes all human expression words, phrases, etc.

FIG. 7, "Mapping Attitudinal Intensity" recognizes radial distances for an attitude.

FIG. 8, "Cartesian System Generic Attitudes", maps 25 generic attitudinal words onto a 5×5 matrix.

FIG. 9, "Mapping Lateral Attitudinal Distance", recognizes lateral distance between different attitudes.

FIG. 10, "Polar Generic Attitudes", is a polar version of the Cartesian matrix of FIG. 8.

FIG. 11, "Sample Dictionary Entries", is a sample lemma table that also recognizes word variations.

FIG. 13, "Virginia Tech Massacre Manifesto Excerpt", is a 211-word excerpt from the full text.

FIG. 14, "Mapped Words of 'The Virginia Tech. Massacre Manifesto'", shows the mapped distribution of attitudinal words in the text.

FIG. 15, "Connecting the Dots of 'Virginia Tech. Massacre Manifesto'", substitutes dots for subjective words and connects consecutive subjective words by lines to chronologically represent the attitudinal mapping of the text.

FIG. 16, "Equivalent Attitudes and Reference Categories", shows the magnitude and tone portions of the generic attitudinal equivalent of words from different reference categories.

FIG. 17, "The Linguistic (Polar) Representation" is a polar version of the common generic mapping of "highly desirable" for three words of different reference categories.

FIG. 18 is a graphical representation example of a smoothed "line of position" mapping of the reference category "engagement."

FIG. 19 is a graphical representation example of a smoothed line of position mapping of the reference category "control."

FIG. 20 is a graphical representation example of a smoothed line of position mapping of the reference category "sovereignty."

FIG. 21 is a graphical representation of a composition of the three line of position curves for the reference categories of FIGS. 18-20, showing the locus of the aggressive generic tone represented by the composited map.

DETAILED DESCRIPTION OF THE PREFERRED EMBODIMENTS

1. The Linguistic Piece

Figure 12A:
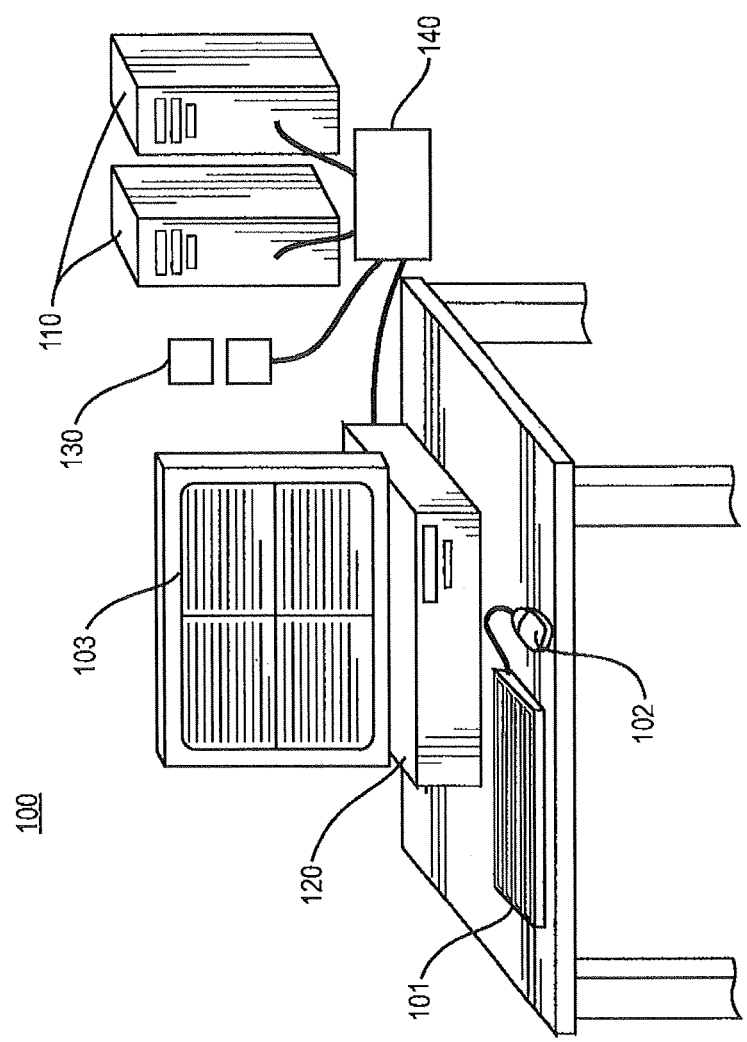
FIG. 12A, "Schematic of Computing System", is a simplified representation of the computing system used to generate analysis information with the present invention.

After writing the referenced book, the inventor discovered that the same matrix that mapped the psychosocial process in organizational development could also representatively map all individual subjective words and phrases. Later, a definition of two types of words emerged: objective words included information, data, knowledge, content, and structure and are normally considered to be absolute and subjective words included human expression and are normally considered to be abstract. (See FIG. 6.) This realization gave way to the notion that, if subjective/attitudinal words could be uniquely mapped, the composite pattern of a text could reveal one's underlying (subconscious) attitude/mindset/frame of mind. (It wasn't until 2008 that the inventor consciously realized that the cultural side of the schematic (FIG. 1) predominantly represents the subconscious process.)

The essence of this technology is best shown by examining two sentences in FIG. 6. Consider the statement, "The woman walked across the street." If one were asked to describe the mindset of the speaker, the answer would have to be that, since the expression was totally objective, as in pure reporting, the speaker's mindset could not be identified.

Now, consider the same sentence with the addition/substitution of three subjective underlined words, "The seductive flirt walked alluringly across the street." What was the writer's mindset? Clearly, the writer was expressing desire, verging on lust. The only thing that changed was the three subjective words.

Although there is little perceived effort to recognize desire or lust, it's also hard to explain this intuitive process. The functional association, however, is more easily recognized on the matrix (FIG. 2), where desire and lust map close to the middle of expecting that the situation should be different and close to the middle of lacking perceived control over the situation, which, incidentally, involves frustration.

2. Quantifying Radial and Lateral Attitudinal Word Distance

The notion that one could linearly, much less geographically, map subjective words defies most people's belief. If, however, one acknowledges that the word, satisfaction, lies somewhere along the radial between neutral and joy and were asked to estimate the location, the choice of "midway" is reasonable. (See FIG. 7.) Based on that notion, the inventor expanded the attitudinal word cells from 2×2 to 5×5 (FIG. 8). Given the 5×5 configuration, the notion that "positive" (laterally) lies approximately midway between "satisfied" and "challenge" satisfied the lateral spacing (FIG. 9), which, when translated from Cartesian to polar (FIG. 10) becomes more evident.

3. Generic Attitudes

FIG. 8 shows the 25 generic attitudinal words of the 5×5 matrix, where three additional horizontal rows and three vertical columns were inserted beyond the primary attitude double pairs of FIG. 2. Interestingly, each word is a highly representative distillation of 16,000 attitudinal words and phrase lemmas.

4. The Polar Coordinate Version

Once the Cartesian points are identified, the present invention transforms the Cartesian matrix (x, y) into a polar equivalent (r, Θ) using the conversion formulas:

$$r=\sqrt{(x^2+y^2)}$$

$$\theta=\mathrm{atan}(y/x)$$

As such, all attitude angularity remains the same and intensity is standardized. FIG. 10 shows an example of the polar coordinate generic attitudes, as expressed in FIG. 8 of the Cartesian coordinate system.

In the inventor's experience, the Cartesian coordinate system provides a more relatable introductory configuration of the matrix process, primarily because the independent variables of expectations of change and perceptions of control are linear. It also works better with the psychosocial approach. A disadvantage of this model is that intensity ranges from unity (at the ends of the vertical and horizontal bisectors) to 1.414 times the same value at the four corners. Although both models are valid, polar is preferred for the linguistic piece.

5. Recognizing Cartesian Coordinates for all Attitudinal Words

This step involved reviewing over 200,000 words in American English usage eight times to establish coordinates for all subjective words. This process references the lemma, which is the basic word. As such, 53,000 subjective words of varying tense (verb) and plurality (noun) distill to 16,000 subjective lemmas.

Additionally, emergent breakthroughs in Natural Language Processing (NLP) minimize ambiguity of meaning in polysemous words (which have the same spelling but different meaning). For example, "like" can be comparative ("This car looks like that car.") or affiliative ("I like my dog.") The first example is objective and the second case is subjective. Whether employing NLP software or conventions to attain the closest attitudinal reference, the point of the present invention is not to distinguish meanings between polysemous words based on the context but to map subjective words relative to expectations of change and perceptions of control.

In this application, the process of mapping words onto the matrix evenly weights the x-coordinate (expectation of change) and y-coordinate (perception of control) to the nearest generic attitude (x- and y-coordinates).

First, one must distinguish subjective words from objective words. Although this step sounds simple, the initial tendency is to over-qualify some objective words as being subjective. For example, the word, "implement", although appearing to be subjective because the term, control, is associated with an independent variable (perception of control), is disqualified because the prerequisite of perception is not necessarily a factor.

The second step is to distill the attitudinal aspect from the meaning of the word. (Ironically, in mapping the attitudinal aspect of the word, meaning becomes irrelevant.) In considering word placement, a poet observed, "You speak wonderfully about this map where every subjective word finds its own location and we listen to their wisdom." Again, the imperative is to recognize the attitudinal equivalence.

A conceptual understanding of both sides of the control corridors is paramount. For example, consider the most appropriate positioning of words that include both an active and a passive aspect, such as, overwhelm. Viewed actively, one football team overwhelmed another. Viewed passively, one feels overwhelmed by overdue bills. Which perspective is most fitting? It's a judgment call based on the primary definition, the most appropriate attitudinal definition, the most common usage as a subjective word, the referencing of other selections in the mapped area, the attitudinal equivalence, recognizing the human tendency to over-validate control, plus other considerations. In the case of "overwhelmed", the choice is to map the word either very high or very low in the expectation of change corridor. This inventor chose the passive version because of its greater feeling/sensation and the notion that the active version is more objective. Although NLP would recognize the more appropriate location, given the situational context, this inventor elected to develop the algorithm before implementing NLP (which can always be added later) in order to focus more on the equivalent attitude than the meaning.

Not only is there temptation to consider the vertical "control" aspect without perception, the horizontal "expectation" aspect can be confusing. Consider, for example, the word "hopeful". On the one hand, one can expect that the situation should be "different" and, therefore position it on the right-hand side. On the other hand, one can expect the item being hoped for as it is perceived, which involves being the "same" and, therefore, should be on the opposite side of the matrix. The correct location of the latter becomes apparent (in mapping to "same") when one considers the antonym of hopeless, wherein one would obviously prefer the situation to be different.

Occasionally, the above methods fail and one must consider neighboring words. As a rule of thumb, if the rules fit and the word appears misplaced among neighboring words, the misfit prevails and the word must be relocated. Although this inventor initially attempted to impose academic rules on the process, it quickly became clear that rules mostly inhibit the process. As it turned out, rather than being primarily a deductive process, it is primarily an inductive one.

In the example from FIG. 6 of mapping seductive, flirt, and alluringly, the appropriate location is in the Frustration Quadrant. By definition, being frustrated involves expecting the situation to be different and perceiving lack of control over the situation. The term, desire, which maps close to frustration, makes the positioning of the three words in the Frustration Quadrant more relatable.

In the process of mapping the words, the inventor initially associated the word under review with the closest generic attitude and then adjusted to the nearest five percentage points relative to the closest generic attitude toward which the mapping might lean. For example, the word, "accountable" was closest to "accepting" (40% same, 40% lack of perceived control). Based on the inventor's judgment, 40% "same" appeared to be representative and so the inventor maintained 40% "same". However, 40% lack of perceived control appeared to be understated and so this inventor adjusted to 50% lack of perceived control. Based on an equal weighting of geographic percentages and generic attitudes, the mapping point computed to the pair (−0.4, +0.5).

By convention, each generic attitude is located in the middle of the cell. As such, the Cartesian value of the generic attitude cells reflects 20 percentage point increments.

As to the question of how the inventor established the 25 generic attitudes (a "chicken and egg" situation), the process involved trial and error, with several hundred candidates temporarily serving as generic attitudes throughout the process. As such, not only did the generic attitudes have to be representative of the mapped words, the configuration of the 16,000 lemmas also had to conform to the most appropriate generic attitude membership.

In the first several passes, this inventor guided the selection of the mapping points based on generic attitudes. After gaining confidence in the process, this inventor reversed the sequence by first selecting the mapping points and then confirming the referencing with the generic attitudes, which was deemed to be more valid. This process was later cross-checked when every attitudinal word/phrase was assigned to a reference category; just as delicious was assigned to the reference category of taste. Once the words were viewed from an entirely different perspective, many relatively minor and a few major adjustments were made, which substantially improved this inventor's confidence of the mapping point identification.

Intensity, which is the distance from neutral to the subjective word, is computed trigonometrically.

Based on the convention of the present system, a table recognizing 53,000 subjective words/phrases was distilled to 16,000 lemmas that, when accessed, recognize the queried subjective word and associated Cartesian coordinate location. FIG. 11 is a sample lemma table.

6. The Analysis Function

The system of the present invention includes a function to automatically process any electronic text, recognize the subjective words, associate Cartesian and polar coordinates for each subjective word based on the lemma table, and map each word onto a Cartesian and polar coordinate grid. Once mapped, the user can view analysis of demographic distributions and patterns, such as the population (or percentiles) in a particular quadrant, corridor (adjacent quadrants), or major triangle, as well as map a chronological sequence of the subjective word usage. While the invention description focuses on the use of the English language, the system and process can be employed for any other language.

Based on the geography of the mapping pattern, relative to the independent as well as dependent variables, the speaker/writer's underlying subconscious mindset can be interpreted.

7. System Automation

The present invention is a system and method configured to enable users to process text onto a Cartesian and polar coordinate system to analyze the underlying attitudinal mindset associated with that text and display the analysis demographically, geographically and metrically. The system of the present invention is the set of functions described herein embodied in a computing system programmed to perform functional steps associated with the method for modeling to be described herein. FIG. 12A shows a representation of a computer system 100 suitable for implementing the functions of the system. The computer system 100 shown is only one example of a suitable computing environment and is not intended to suggest any limitation as to the scope of use or functionality of the invention. For example, the computer system 100 may be associated with local or remote computing means, such as one or more central computers, such as server 110 in a local area network, a metropolitan area network, a wide area network, or through intranet and internet connections.

The computer system 100 may include one or more discrete computer processor devices, represented by desktop computer 120, for example. Examples of well known computing devices that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like. The computer system 100 may include computer devices operated by one or more users, such as through a desktop, laptop, or servers, and/or one or more providers of services corresponding to one or more functions of the invention.

The server 110, the computer processor 120, or a combination of both may be programmed to include one or more of the functions of the invention system. One or more databases represented by database 130 that may be associated with the server 110, the computer processor 120, other computing devices, or any combination thereof, include information related to the use of the invention system. For example, the database 130 may include information of importance to the user. The database 130 may be populated and updated with information provided by an application provider capable of carrying out one or more of the steps associated with the system of the invention, one or more businesses, or any other information providers. All of the devices may be interconnected through one or more signal exchange devices, such as router/switch 140.

The invention may be described in the general context of computer-executable instructions, such as program modules, being executed by a computer. Generally, program modules include routines, programs, objects, components, data structures, etc. that perform particular tasks or implement particular abstract data types. As indicated above, the system of the present invention may also be practiced in distributed computing environments where tasks are performed by remote processing devices that are linked through a communications network or other data transmission medium. In a distributed computing environment, program function modules and other data may be located in both local and remote computer storage media including memory storage devices.

The computer processor 120 and interactive drives, memory storage devices, databases and peripherals may be interconnected through one or more computer system buses. The system buses may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system 100 typically includes a variety of computer readable media. Computer readable media can be any available media that can be accessed by computer system 100 and includes both volatile and non-volatile media, removable and non-removable media. By way of example, and not limitation, computer readable media may comprise computer storage media and communication media. Computer storage media includes volatile and non-volatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer system 100.

The computer system 100 further includes computer storage media in the form of volatile and/or non-volatile memory such as Read Only Memory (ROM) and Random Access memory (RAM). RAM typically contains data and/or program modules that are accessible to and/or operated on by computer processor 120. That is, RAM may include application programs, such as the functional modules of the system of the present invention, and information in the form of data. The computer system 100 may also include other removable/non-removable, volatile/non-volatile computer storage and access media. For example, the computer system 100 may include a hard disk drive to read from and/or write to non-removable, non-volatile magnetic media, a magnetic disk drive to read to and/or write from a removable, non-volatile magnetic disk, and an optical disk drive to read to and/or write from a removable, non-volatile optical disk, such as a CD-ROM or other optical media. Other removable/non-removable, volatile/non-volatile computer storage media that can be used in the computer system 100 to perform the functional steps associated with the system and method of the present invention include, but are not limited to, magnetic tape cassettes, flash memory cards, digital versatile disks, digital video tape, solid state RAM, solid state ROM, and the like.

The drives and their associated computer storage media described above provide storage of computer readable instructions, data structures, program modules and other data for the computer processor 120. A user may enter commands and information into the computer processor 120 through input devices such as a keyboard 101 and a pointing device 102, commonly referred to as a mouse, trackball or touch pad. Other input devices (not shown) may include a microphone, joystick, game pad, satellite dish, scanner, or the like. These and other input devices are connected to the computer processor 120 through the system bus, or other bus structures, such as a parallel port, game port or a universal serial bus (USB), but is not limited thereto. A monitor 103 or other type of display device is also connected to the computer processor 120 through the system bus or other bus arrangement. In addition to the monitor 103, the computer processor 120 may be connected to other peripheral output devices, such as printers (not shown).

The computer processor 120 may be configured and arranged to perform the described functions and steps embodied in computer instructions stored and accessed in any one or more of the manners described. The functions and steps, such as the functions and steps of the present invention described herein, individually or in combination, may be implemented as a computer program product tangibly as computer-readable signals on a computer-readable medium, such as any one or more of the computer-readable media described. Such computer program product may include computer-readable signals tangibly embodied on the computer-readable medium, where such signals define instructions, for example, as part of one or more programs that, as a result of being executed by the computer processor 120, instruct the computer processor 120 to perform one or more processes or acts described herein, and/or various examples, variations and combinations thereof Such instructions may be written in any of a plurality of programming languages, for example, XML, Java, Visual Basic, C, or C++, Fortran, Pascal, Eiffel, Basic, COBOL, and the like, or any of a variety of combinations thereof. The computer-readable medium on which such instructions are stored may reside on one or more of the components described above and may be distributed across one or more such components.

Figure 12B:
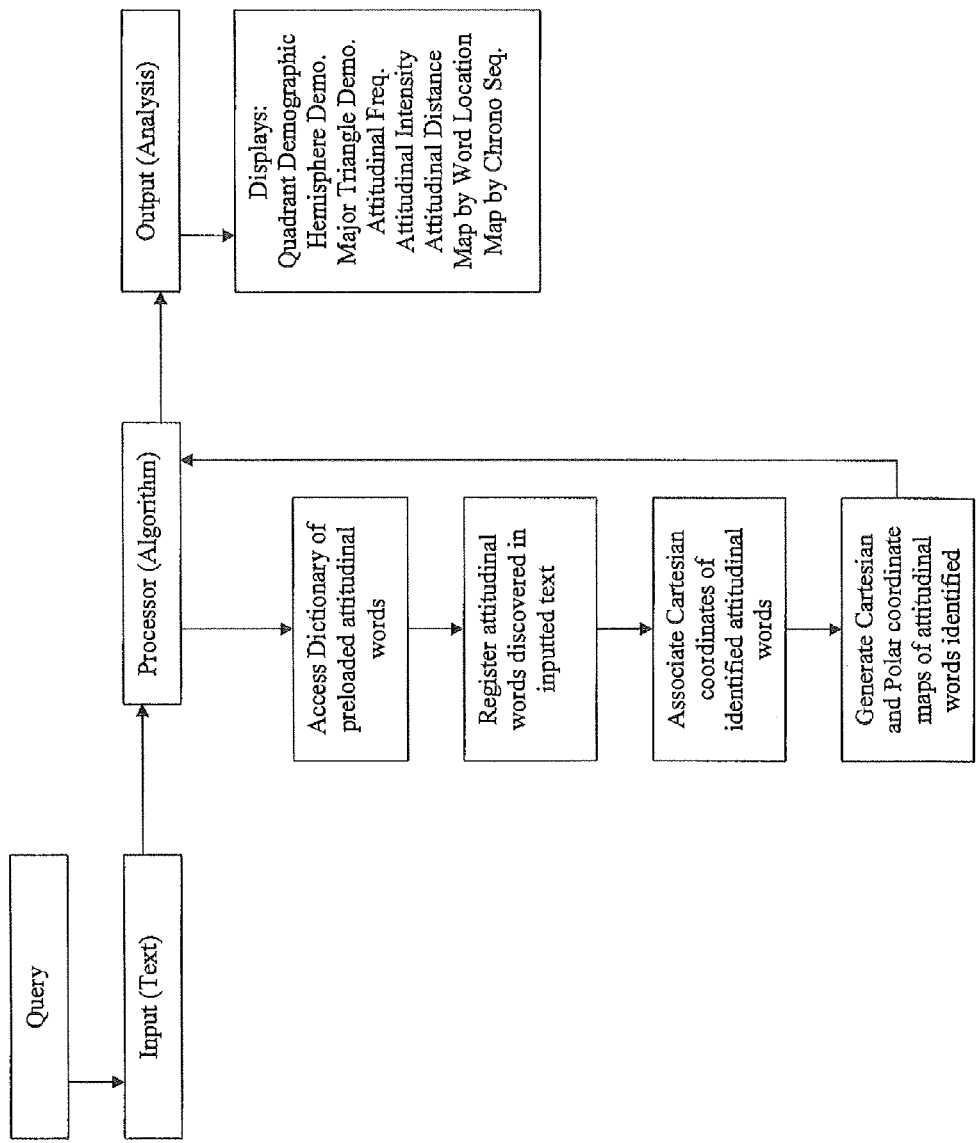
FIG. 12B, "Schematic of Computer Algorithm", shows inputs, outputs, and computer processing stages.

Any text to be analyzed can be input into the computer processor 120. As represented in FIG. 12B, once that text has been inputted in the Input Phase of the method of the present invention, the one or more computer programs comprising the functions of the present system access the Dictionary of preloaded subjective words and associated Cartesian coordinates. As words from the text are sequentially compared to listed subjective words, those that are present register and the respective Cartesian coordinates are assigned. When all words of the text are reviewed, the computer program creates an electronic map on the matrix showing the geographic locations of all of the listed subjective words from the text. That is, the present invention transforms the computer system 100 to generate an output that would not be enabled without the invention.

In the Output Phase, the user selects from a menu of demographic distributions. Both quantity and percentages are available for the following categories: quadrant demographics, corridor demographics, major triangle demographics, frequency, and intensity. Also, a map of each subjective word can be selected as well as a map of chronologically connected points of those words, which also computes the average distance between all sequential subjective words, as a percentage of quadrant width.

The invention provides a computer-implemented method of processing through software and the computer system 100 embodying functions that enable a user to analyze text for the underlying attitudinal mindset associated with that text. The computer-implemented method uses the following computer-implemented functions, the computer system 100 and one or more databases represented as database 130 to execute a word parsing function and a word filtering function that parses words of the text into objective words and subjective words and stores the parsed words of the text in the one or more databases. A word analysis function is also executed that compares the parsed subjective words with registered subjective words preloaded in the one or more databases, associates two-dimensional coordinates with each of the subjective words of the text as a result of the comparison and stores the associated two-dimensional coordinates for the subjective words of the text in the one or more databases. A mapping function may further be executed that creates a map showing geographic locations of each subjective word of the text in relation to each other subjective word of the text.

The invention also provides as part of the computer-implemented method an output selection function that enables the user to display a map of chronologically connected points of the subjective words of the text and to compute the average distance between sequential subjective words as a percentage of quadrant width. A report generation function of the computer system may be executed to create a report interpretive of the text based on the map created by the mapping function. The present invention also provides a computer-implemented method of assigning digital attributes to subjective words using the computer system 100 to execute the word analysis function to associate two-dimensional coordinates to the subjective words. The invention further provides a computer-implemented method of generating text to reflect a selectable attitudinal mindset associated with that text in which the mapping function of the computer system 100 is executed to select geographic locations of interest for subjective words to include in the generation of the text and executing the word analysis function to return two-dimensional coordinates corresponding to the selected geographic locations of interest and to return from the database 130 subjective words associated with the returned two-dimensional coordinates. The invention also provides a text generating function of the computer system 100 to generate text including the returned subjective words and reflective of the attitudinal mindset. As an aspect of the invention, there is yet further provided a computer-implemented method of delaminating subjective words by executing the word analysis function to decompose the subjective words into attitudinal equivalence and reference category.

8. The Interpretation Process

Just as attitudes and human expression are perceived to be abstract elements, lacking interpretation, a numerical value of a matrix reference (e. g., 40% satisfied, 16% expecting change, or 65% collaborative), while providing informational stepping-stones, fails to sufficiently express the underlying mindset. However, given mathematical references, like learning any foreign language, practice hones the art. Although more detailed expansions on this technology will be presented in the future, this section provides a sense of how the functions of the present invention transform the computer system 100 to interpret mathematical referencing into the mindset associated with the writer of the text under analysis.

Initially, most will find the absence of information, knowledge, content and meaning to be disconcerting. However, interpreting the mindset is entirely different from "learning what is on someone's mind". So, one should forget what is happening and allow the metrics to guide toward the mindset.

The first step is to understand the geography of the matrix, recognizing that the independent variable of expectation of change (same through different) incorporates both the more abstract notion of expectation and the more absolute reference of continuum of change. Similarly, perception of control exercises both of the terms, perception (more abstract) and control (more absolute). For example, if one expects change and perceives lack of control, the attitude is frustration, by definition. If, however, one shifts perception for the same situation from lack, thereof, to presence, then one shifts to challenge—whether or not control is present. If it is not perceived, it doesn't qualify on the matrix, regardless of its existence.

Thereafter, population densities provide mathematical concentrations that can be interpreted psychosocially, based on degree. For example, 90% satisfaction converts to "very strongly satisfied" and 15% challenge converts to "slight challenge".

The corridors of expectation of change translate better to "emotional stress" for "different" and harmonic for "same", with graduated increments along the continuum. Perception of control translates best to empowerment, or lack, thereof. In practice, greater usage falls upon expectation of change than "same" and considerably more perception of control occurs than lack, thereof.

After understanding the independent variables, the four primary attitudes of satisfaction, frustration, challenge, and acceptance must be understood in terms of the independent variables. Typically, the acceptance quadrant (which incorporates values, beliefs, and spirituality) is the least exercised quadrant and the challenge quadrant (which reflects "unfinished business") is the most utilized quadrant.

There are two pairs of major triangles: desirable/undesirable and collaborative/competitive. As such, equal distances away from the major diagonals constitute equivalent values within each respective triangle. For example, just as the five generic attitudes along the desirable/undesirable boundary of: tranquil, accepting, neutral, challenge, and assertive in FIG. 8 are neutral and equivalent from a desirable/undesirable standpoint, the next four in line toward undesirable of: submissive, unsure, different, and ambitious are considered equivalent in terms of being slightly undesirable. Also, in the practice of interpreting metrics, the desirable/undesirable triangles associate with satisfaction/dissatisfaction, which this inventor often relies upon.

This same analogy also applies for the collaborative/competitive triangular pair. Of note, if the notion of competitive is destructive, then hostile is more appropriate. If, however, the notion of competitive is constructive, motivational is more appropriate.

Superimposed upon the Emotional Axis are the attitudes of relationship, fairness, and reasonableness. Interpretation of an entry in terms of one of these categories conforms to the perpendicular distance away from the major boundary, just as in desirability. As such, an entry in the joy generic attitude could mean a highly desirable relationship, highly fair, or highly reasonable.

An important recognition is not only where the dots concentrate, but also where they do not concentrate. Often, these figurative "deserts" provide pertinent insight into the mindset interpretation of the text.

The demographic and geographic populations are easier to interpret than symmetries and higher order metrics, which follow.

Major diagonal axes of Emotional (frustration to satisfaction) and Conviction (acceptance to challenge) are very important in recognizing the mindset. Generally speaking, one can tell to which axis the dots most closely align, which determines the reliance, and to what degree/extent.

Three derived metrics of: attitudinal frequency, intensity, and distance also provide an insightful view into the speaker/author's subconscious frame of mind.

Attitudinal Frequency is the percentage of subjective words within the text. In general, attitudinal frequency references the speaker/author's subconscious effort to subliminally influence. Given the average percentage of narrative or conversation of 18%, persuasion, which reflects conscious and subconscious interest in influencing, is at 23% and, at the opposite end, scientific and technical journals, which seek to avoid overt subliminal influencing, rely, instead, on scientific principle, average in the mid-teens. Low percentages, however, even in the middle teens, do not necessarily specify scientific or technical referencing. This inventor has observed this practice in poetry, which can employ an austerity of subjective words to achieve understated effect.

Attitudinal Intensity is self-explanatory and can (but does not always) express forcefulness.

Attitudinal Distance is the geographic distance between consecutive subjective words/phrases, measured as a percentage of one quadrant length/width. The significance of attitudinal distance is the eloquence that is expressed. Of practical use, attitudinal distance averages 94.5%, least for instruction at 88% (and, surprisingly, factual advertising at 82.9%) and most for prayer and persuasion, poetry, and tribute (99%). In addition, an analogy exists with oxymorons, which are consecutive pair, consciously-recognized, incongruities, such as "wicked good" (attitudinal distance of 150%), and "awfully good" (attitudinal distance of 160%). Subconsciously, they create tension and are favored as subconscious intensifiers. A stronger example of attitudinal distance is Shakespeare's "parting is such sweet sorrow" (attitudinal distancing of 180%) in Romeo and Juliet", where, outwardly, "sweet" is an entirely inappropriate modifier of "sorrow", in part, because 1) it is the wrong reference category (taste vice feeling) and 2) it is the obverse modifier (desirable vice undesirable). Yet, instead of being patently wrong, it is succinctly correct. Just as the more evident "sweet sorrow" creates subconscious stimulation/tension, every consecutive pair of subjective words provides a quantifiable subconscious tension, wherein this subconscious stimulation/tension is directly proportional to the distance metric. In the inventor's opinion, attitudinal frequency and distance are more useful than intensity.

In terms of interpretation, it is easier to begin with raw metrics of dot distribution and then proceed to the weighted metric indices, which provide a more subtle message.

The electronic text automatically generates a ledger of representative metric indices (e.g., "emotional stress: 75%") and identifies typical through atypical values.

9. Developing the Report

Developing an analytical report follows along similar lines for most analytical reports. For example, a financial analysis first identifies the largest expenses or atypical projections and a loss control analysis begins by identifying the greatest cost of damage or the source of greatest injuries. By the same token, in examining the metric indices, it becomes evident which are the largest or the most atypical and these most prominent elements associate the appropriate pro forma statements, which set the tone for and contribute to the construction and development of the nature and direction of the report. In general, reviewing a text to interpret the subconscious attitudinal mindset involves open-mindedness, practice, and an artistic flair.

10. Review of "The Virginia Tech. Massacre Manifesto"

An example of applying the mapping process is shown in FIG. 13, "The Virginia Tech. Massacre Manifesto", a 211-word excerpt where subjective words are underlined and FIG. 14 shows the mapping of subjective words onto the matrix. FIG. 15 shows the consecutively linked of subjective words. Derived features include the percentage distribution of entries within the four primary quadrants and the sequential connection of the dots. A review, which analyzes for underlying attitudinal mindsets, follows.

73% of entries in the Emotional Stress corridor is highly unusual and reflects a dangerous situation. In particular, with a strong density in the Challenge Quadrant, the notion to effect change, in combination with anger and frustration, translates to a hostile interpretation of this text. Clearly, the majority of entries form within the lower right-hand triangle (the Competitive Triangle). In particular, the density of entries farther from the center of the map (which reflects lack of neutrality), reflects a discomforting multiplier. With only two entries in the Acceptance Quadrant and seven entries in the Satisfaction Quadrant, as contrasted with 24 entries in the Emotional Stress domain, the interpretation becomes more ruthless and sinister.

Assurance of purpose is reflected in the density of entries ranging from confidence to assurance in the middle of the lower vertical boundary and the absence of any uncertainty entries, which, if present, would have been located in the upper portion of the middle vertical boundary.

Since the majority of the connecting lines are parallel to the Emotional Axis (more from upper right to lower left than upper left to lower right), the author is expressing strong emotional instability ("Now I feel good. Now I feel lousy. Now I feel good. Now I feel lousy . . . "), which makes this text one of high concern.

The present invention considers subjective words that may include partial objective meaning as well. The word "handshake" provides both an objective action and also symbolizes goodwill or a promise of action, which are subjective in nature. Therefore, the analysis described hereunder sometimes includes as subjective words those words which may also be considered objective by considering such words in the context of the entire text.

The present invention can be fairly summarized as the integration of attitudinal equivalence (which may be further parsed into characterizations of magnitude and tone) and reference categories for all subjective words, as represented in FIG. 16 wherein subjective words are decomposed into attitudinal equivalence and reference category as shown and analyzed as previously described herein. In the example of the phrase "highly desirable" shown in FIG. 16, "highly" corresponds to the magnitude of the term and "desirable" corresponds to the tone of the term and demarks the polar linguistic representation of the term. The parsed term may be further characterized as a function of the particular reference category. For example, with respect to taste, "highly desirable" corresponds to the word "delicious" that may then be mapped. As such, that word and the others shown in FIG. 16 are generic equivalents with respect to their subjective nature. The polar coordinate representation of the equivalent attitudes is shown in FIG. 17 and may be described in a similar manner as used in describing the polar configuration established in FIG. 10. In essence, FIG. 10 and FIG. 17 represent the same domain where FIG. 10 guides more toward the dependent variables of specific (psychosocial) attitudes within the polar region and FIG. 17 is directed more toward the general psychosocial domains. As such, FIG. 17 enables a more relatable mapping of subjective words (in accordance with FIG. 16) where using only FIG. 10 makes the jump from subjective linguistics directly to mapping more cumbersome. Interestingly, the eight external terms outside the polar region of FIG. 17 of: ease, collaboration, uncertainty, undesirability, difficulty, competition, and assurance, which enable this smoother transition, emerge as pivotal and more strategic psychosocial referencings in the interpretation process.

In analyzing subjective words, FIGS. 8 (Cartesian) and 10 (polar) provide digital representations of the decomposed equivalent attitudes. Based on a broad menu of multivariate analysis of equivalent attitudes, an entire, stand-alone analysis can be made of the author's underlying frame of mind using only equivalent attitudes. Interestingly, the complement (in the decomposition process) of reference categories provides a second, stand-alone source for analysis of the author's underlying frame of mind.

It may be recalled that FIG. 5 shows mapping of 41 subjective words in a scattered alignment loosely ranging from strong desirability (ambrosial) to strong undesirability (unpalatable). Upon statistical smoothing, a single, slightly curved line characterizes the mapping flow. Given approximately 250 reference categories, which also contain all of the 16,000 mapped subjective root words (which were the same used for equivalent attitudes), each individual reference category enjoys its own signature statistical mapping modulated "line of position" where some (like the taste reference category) are generally linear but where most others are less linear although still conformal to the statistical smoothing process.

As a text under analysis presents one or more entries in a particular reference category, a "line of position" that is associated with that particular reference category is representative of the more general tone of the text. (While just a single entry in a reference category is relevant, the addition of another entry for the same reference category markedly increases the confidence of validity of that "line of position".) As several reference categories emerge (especially with multiple entries in each reference category), the "lines of position" can be superimposed onto the generic attitudes matrix of FIG. 8 and the locus of intersection of all of the "lines of position" demark the general tone of the text.

FIGS. 18-20 show example individual statistically-smoothed reference category lines of position for each of the reference categories sovereignty, engagement, and control. FIG. 18 shows the superposition of those three independent reference category lines of position. As can be seen, the locus of intersection occurs in the lower right-hand corner of the matrix in this example, which, based on the generic attitudes of FIG. 8, identifies the overall tone of the text as aggressive.

The present invention provides for the distillation of subjective words into more generic equivalencies. With reference to the example of FIG. 16, the words delicious, beautiful, and excellent all elicit high desirability as the attitudinal equivalent based on the three primary components magnitude, tone and reference category of every subjective word. FIG. 17 shows the interface between the decomposition model and polar (linguistic) representation.

While much of the discussion herein about the present invention is directed to the decoding of text for an assessment of attitudinal state of mind of the author, the invention also provides for the encoding of words to establish text representative of attitudinal state of mind. Specifically, a user of the system may identify a particular tone and magnitude of text that may be of interest. The invention embodied in the software as described herein includes a function for generating text of a selectable tone and magnitude wherein a mapping in a particular Cartesian or polar coordinate configuration may first be set and then that desired tone used to extrapolate text. This functionality may be used to assist creating a document that produces a desired message for readers. Additionally, this functionality may be combined with the interpolative functionality previously described to carry out a dialogue primarily or completely through the system. Such capability to generate text of a particular tone and magnitude to match or to attempt to persuade a change in tone and magnitude in an exchange with a party may have a wide range of applications including, but not limited to engaging with individuals that may be security risks to either entice them into detailed disclosure or to influence a change in perceived contemplated action. Another option for such an interactive "tone thesaurus" may be employed in a device suitable for interaction with others including, but not limited to, robotics which have implemented intelligence that can understand and generate a range of attitudinal exchanges.

In effect, the present invention digitizes human expression. It transforms subjective linguistics into mathematical representations that may be characterized as well as used to generate text. A computer programmer thereby has the capability to incorporate subjective linguistics into a program. The result may be a computing device capable of functioning at a human preconscious/subconscious level of "thinking." Given that functionality, a computing device can interact with a human and/or with other computing devices to understand and impart subconscious human messaging.

It is to be understood that the interpolation and extrapolation functions described herein may be implemented in any language and the characterizations of tone remain common for all languages. Therefore, the associated expectations of change and perceptions of control regarding text observed or generated are unchanged when words of any language are entered in reference categories. The result is an avoidance of misunderstanding of the underlying tone in received text or generated text.

REFERENCES CITED ARE

1. Osgood, Charles E., Suci, George J., Tannenbaum, Percy H (1957). "The Measurement of Meaning". University of Illinois Press.
2. Pang, Bo; Lee, Lillian (2008). "4.1.2 Subjectivity Detection and Opinion Identification". Opinion Mining and Sentiment Analysis. Now Publishers Inc. http://www.cornell.edu/home/llee/opinion—mining-sentiment-analysis-survey.html.
3. Rada, Mihalcea; Carmen Banea and Janyce Wiebe (2007). "Learning Multilingual Subjective Language via Cross-Lingual Projections". Proceedings of the Association for Computational Linguistics (ACL). pp. 976-983. http://www.cse.unt.edu/~rada/papers/mihalcea.acl07.pdf.
4. Bo Pang; Lillian Lee (2004). "A Sentimental Education: Sentiment Analysis Using Subjectivity Summarization Based on Minimum Cuts". Proceedings of the Association for Computational Linguistics (ACL). pp. 271-278. http://www.cs.cornell.edu/home/llee/papers/consent.home.html.

The present invention as described is a system and related method for analyzing the attitudinal expressions associated with text. The invention has been described with specific reference to a certain system, functions, algorithms and method steps configured to enable a computing system to perform the actions described and to enable completion of an attitudinal analysis. The invention is not limited to the specific arrangements and outputs described herein. It is to be understood that the invention includes all reasonable equivalents.

What is claimed is:

1. A computer-implemented method of processing text to analyze the underlying subconscious mindset associated with that text, the computer-implemented method using a computer system having (i) a plurality of computer-implemented functions, and (ii) one or more databases, the computer-implemented method comprising the steps of:
   a) executing a word parsing function and a word filtering function of the computer system that
      (i) parses words of the text into objective words and subjective words; and
      (ii) stores the parsed subjective words of the text in the one or more databases;

b) executing a word analysis function of the computer system that:
  (i) compares the parsed subjective words with registered subjective words preloaded in the one or more databases, wherein the registered subjective words include substantially all subjective words and are assigned two-dimensional coordinate values based on expectation of change associated with one of the two dimensions and perception of control associated with the other of the two dimensions, wherein expectation of change reflects a range from expectation that a situation should be different to expectation that a situation should remain the same and wherein perception of control reflects a range from lack of control of a situation to perceived control of a situation;
  (ii) associates two-dimensional coordinates with each of the subjective words of the text as a result of the comparison with the registered subjective words; and
  (iii) stores the associated two-dimensional coordinates for the subjective words of the text in the one or more databases; and
c) executing a mapping function of the computer system using the two-dimensional coordinates that creates a map showing geographic locations of one or more subjective words of the text in relation to one or more other subjective words of the text, wherein collocated mapping points of two or more subjective words constitute attitudinal equivalence of those two or more subjective words.

2. The computer-implemented method of claim 1 further comprising the step of executing an output selection function of the computer system that enables a user to select from a menu of multivariate distributions from the map of subjective words.

3. The computer-implemented method of claim 2 wherein the multivariate distributions are selected from the group consisting of, but not limited to, quadrant demographics, corridor demographics, major triangle demographics, frequency, intensity, and average distance.

4. The computer-implemented method of claim 1 further comprising the step of executing an output selection function of the computer system that enables the user to display a map of chronologically connected points of the subjective words of the text and to compute the average distance between sequential subjective words, as a percentage of quadrant width.

5. The computer-implemented method of claim 1 further comprising the step of executing a report generation function of the computer system that creates a report interpretive of the text based on the map created by the mapping function.

6. The computer-implemented method of claim 1 wherein the two-dimensional coordinates are Cartesian coordinates.

7. The computer-implemented method of claim 6 further comprising the step of executing the word analysis function of the computer system to convert the Cartesian coordinates associated with the registered subjective words into polar coordinates prior to executing the mapping function.

8. The computer-implemented method of claim 1 wherein the registered subjective words of the one or more databases comprise substantially all tenses and singular and plural forms, thereof.

* * * * *